Nov. 29, 1960   R. I. MOORE   2,962,329
WHEEL HUB SEAL
Filed Sept. 3, 1957
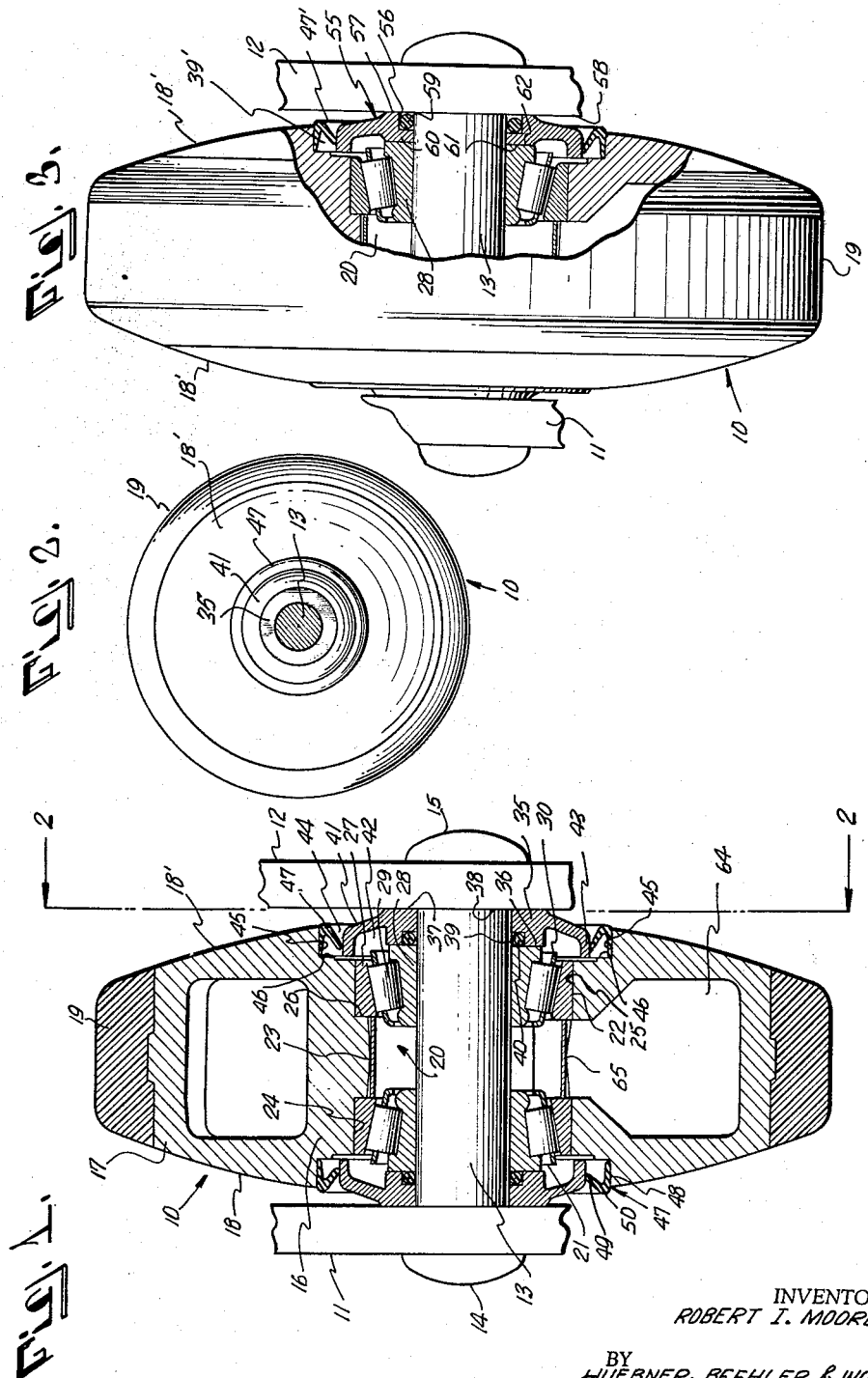
INVENTOR.
ROBERT I. MOORE
BY
HUEBNER, BEEHLER & WORREL
ATTORNEYS.

United States Patent Office 2,962,329
Patented Nov. 29, 1960

2,962,329
WHEEL HUB SEAL

Robert I. Moore, North Hollywood, Calif., assignor to Aerol Co., Inc., Los Angeles, Calif., a corporation of California Filed Sept. 3, 1957, Ser. No. 681,743

4 Claims. (Cl. 308—187.1)

The invention relates to wheels such, for example, as caster wheels, and has particular reference to wheels for the support of trucks, dollies, etc. which are used for the moving of sundry materials over the floors and runways of warehouses and factories. More particularly the invention is directed to the provision of a wheel wherein moving parts are effectively sealed to the extent that the wheel can be repeatedly cleaned and sterilized with a minimum amount of corrosion and deterioration being experienced.

In the handling of foods in particular regulations and the necessities of keeping such equipment sterile requires that each and every portion of equipment used to handle such materials must be regularly cleaned, washed and sterilized, usually at the close of business on each day, so that there will be no risk of contamination during succeeding days of use as the result of decomposition of food stuffs remaining. Although wheels, and especially wheels carried by roller bearings, are ordinarily rather well packed so as to retain the grease packing effectively confined therein, the usual type of packing is not sufficiently tight to prevent the ingress of cleansing and sterilizing liquids. Even though such packing might resist two or three of such sterilizing operations, the cumulative effect is such that the caustic action of the sterilizing liquids ultimately finds its way into the packing and grease causing deterioration of the metal parts and particularly ferrous metal parts, as well as washing some of the lubricants out of the grease packed area with a resulting damage to the rolling surfaces.

Although some attempts have been made heretofore in order to construct and make available seals for wheels of this kind aimed at the exclusion of detergents and sterilizing liquids and chemicals, the seals have not completely solved the problem either because of presenting too many mutually rotating surfaces subject to wear or on occasions because the structure has been somewhat complicated involving an undesirable large number of parts or parts of such design as to impair economical manufacture and effective and rapid assembly and disassembly. Such attempts have also frequently made necessary use of sealing rings not readily accessible for servicing and in some instances has resulted in the construction of wheel assemblies wherein stationary portions have been of small diameter, thereby making the construction and mounting difficult for wheels of design such that the shafts therefor need to be non-rotatably fixed on the requisite wheel mounting.

It is therefore among the objects of the invention to provide a new and improved sealed wheel which is relatively simple in construction and which is of such design that a minimum area is presented to the cleansing and sterilizing action during cleansing and sterilizing operations.

Another object of the invention is to provide a new and improved sealed wheel of relatively simple structural design especially with relation to the bearing portions, the design being such as to limit rotating sealing surfaces to one or at most two locations, thereby to minimize the action of wear and accordingly reduce to a substantial degree the need for servicing.

Still another object of the invention is to provide a new and improved sealed wheel of such construction as to present a relatively smooth and substantially continuous exposed surface presenting virtually no areas upon which food materials might collect or become lodged, thereby to greatly facilitate the cleaning and sterilizing operation.

Still another object of the invention is to provide a new and improved sealed wheel wherein relatively stationary portions of the mutually rotating surfaces can be securely sealed and packed with respect to an exterior wheel support and wherein those areas supporting mutual rotation are confined to a minimum and are of such form that they effectively exclude detergents, soaps and sterilizing material from the interior rolling portions of the wheel and at the same time effectively confine the lubricating packing therein.

Still further among the objects of the invention is to provide a new and improved sealed wheel construction which permits of the employment of materials on the exterior having a relatively great resistance to corrosion and which permits the forming of such materials in such manner that those materials on the interior which, as a practical necessity may be more readily subject to corrosion, can be carefully protected from deteriorating effects.

With these and other objects in view, the invention consists in the construction, arrangement and combination of the various parts of the device whereby the ob jects contemplated are attained, as hereinafter set forth, pointed out in the appended claims and illustrated in the accompanying drawings.

In the drawings:

Figure 1 is a transverse sectional view of a wheel and its bearings shown contained within a conventional wheel support.

Figure 2 is a side elevational view of the wheel taken on the line 2—2 of Figure 1.

Figure 3 is a vertical view partially in section showing a modified form of sealing structure.

In an embodiment of the invention chosen for the purpose of illustration there is shown a wheel indicated generally by the reference character 10 which in this instance is mounted between two wheel supports 11 and 12, frequently termed a fork. The wheel is shown mounted upon an axle or shaft 13 non-rotatably anchored to the supports by retainers 14 and 15 which may be rounded nuts or other appropriate retaining means capable of supporting a smooth exterior but which at the same time are permissive of removal in the event that the wheel might need to be removed for repair or replacement.

The wheel 10 is of relatively simple structure and includes a hub portion 16, a rim portion 17 and progressively tapering side walls 18 and 18'. At the perimeter of the rim there is shown a solid tire 19 of some suitable semi-resilient but wear-resistant material.

At the center of the hub portion there is formed a bearing cavity indicated generally by the reference character 20, the bearing cavity being of somewhat composite character and providing ample space for sets of roller bearings 21 and 22 within ample area for the reception of a suitable lubricating packing.

At the center of the bearing cavity is a web 23 and on each side of the web is a bearing race recess, the recess on the left, as viewed in Figure 1, being identified by the reference character 24, and the recess on the right by the reference character 25. Inasmuch as in the embodiment chosen the structure on each side of the center line of the wheel is the same, only one side will be described in detail.

On the right side, for example, as viewed in Figure 1, it will be noted that the bearing race recess 25 forms a shoulder 26 between itself and the web 23. An outer race 27 of the bearing 22 is pressed against the shoulder and seats in the recess 25. An inner race 28 of the same bearing surrounds the shaft 13 in a position whereby to contain roller bearings 29 between the races, operatively positioned by means of a bearing retainer 30.

A seal ring keeper 35 annular in form is confined between the wheel support 12 and the inner race 28 of the bearing. It will be noted that the seal ring keeper is provided with an annular mid-portion 36 which is adapted to bear directly against the outside surface of the inner bearing race 28. A flat exterior surface 37 of the keeper is forced against the inner surface 38 of the wheel support 12.

As a seal for this portion of the wheel there is provided on the inner side of the seal ring keeper an annular seal ring recess 39 within which is confined an O-ring 40 compressed therein so as to effectively seal the recess between the bottom and outside wall of the recess and the adjacent face of the inner bearing race 28. This seal is relatively stationary since the adjacent members do not move with respect to each other.

The keeper moreover is provided with a dished portion 41 here illustrated as presenting a hollow pocket 42 facing the bearing 22. At the perimeter of the keeper there is an annular inwardly extending projection 43 of such size that its innermost annular edge lies adjacent the hub portion but in such position that there is a clear space therebetween. On the hub itself extending inwardly from the side wall 18' is an annular rotating seal ring recess 44 formed by a wall 45, a bottom 46, and the adjacent outer surface of the annular projection 43. Within this recess is a resilient sealing ring 47. The sealing ring is somewhat specially shaped in that it comprises an outer flange 48 and an inner flange 49 spread with respect to each other and retained together at adjacent edges 50. The flanges 48 and 49 are distended with respect to each other to provide a space therebetween. The outer flange when in position has its outer face resiliently pressed into engagement with the wall 45 of the seal ring recess whereas the inner flange has its rim resiliently pressed into engagement with the outer perimeter of the annular projection 43. When the wheel rotates the keeper remains stationary and there is rotation about the sealing ring 47.

In the form of device illustrated in Figure 3 a seal ring keeper 55 is provided with an annular recess 56 on an outside face 57 thereof facing an inside surface 58 of the wheel support 12. An O-ring seal 59 is confined and sealed within the recess and seals any likely access into or out of the bearing cavity along the shaft 13. In this instance an annular mid-portion 60 presents a surface 61 in face to face engagement with a surface 62 of the inner bearing race 28. Inasmuch as the keeper is adapted to be retained in a non-rotatable position, there is no movement at the area of the surfaces 61 and 62 between the keeper and the inner race. In other respects the structure of the keeper 55 is substantially similar to that of the keeper 35 wherein there is confined a sealing ring 47' within a seal ring recess 39' with the sealing ring resiliently distended as heretofore described in order to seal access to the bearing cavity 20.

In those instances where the wheel 10 may be of relatively large or heavy construction, spaces 64 may be provided as by mold cores, thereby to lighten the section. In this instance there will be provided a close-off sleeve 65 for damming access to the space 64 and for confining the packing to that portion of the bearing cavity where such packing is most effective.

There has accordingly been shown and described herein a sealed wheel structure such that the bearing cavity is of ample space sufficient to be thoroughly packed with lubricant and which is so designed that discs adapted to cover and protect the bearings may be securely anchored between legs of a wheel fork or other comparable wheel supports and moreover constructed specially to make it necessary to use only one rotating seal on each side built substantially flush with the exterior of the wheel, the entire wheel structure being of a design permitting all surfaces to be substantially flush thereby to afford a minimum of opportunity for food stuffs and refuse to collect in the first instance and also to provide ample opportunity for the sanitary removal of any such food stuffs as might collect.

While I have herein shown and described my invention in what I have conceived to be the most practical and preferred embodiment, it is recognized that departures may be made therefrom within the scope of my invention, which is not to be limited to the details disclosed herein but is to be accorded the full scope of the claims so as to embrace any and all equivalent devices.

Having described my invention, what I claim as new and desire to secure by Letters Patent is:

1. A sealed wheel comprising a body having a hub, a rim narrower in width than the hub and side walls tapering progressively from said hub to said rim providing thereby a flush exterior surface, means forming a bearing cavity extending through said hub from one side wall to the other, a central web in said cavity, means forming a bearing race recess in the cavity on each side of the web and of diameter larger than said cavity, and a shoulder between the web and the recess, means forming a laterally open seal ring recess in the hub at the outside of each bearing ring recess and of diameter greater than the bearing ring recess, a shaft extending through the bearing cavity, a pair of bearings comprising each an outer bearing race in each bearing ring recess and an inner bearing race in engagement with the shaft, a relatively stationary seal ring keeper disc on each side comprising a dished portion overlying the bearing, means forming a shaft aperture through each disc and means forming an annular recess in the keeper adjacent the shaft aperture and the inner bearing race, and an annular resilient seal ring stationarily confined in said last recess in sealing engagement respectively with the shaft and the walls of said last recess, said keeper having a perimeter smaller in diameter than the seal ring recess, and an annular resilient rotatable seal ring in the seal ring recess, said rotating seal ring having an outer flange fixed in resiliently pressed engagement throughout the surface thereof with the outer wall of the seal ring recess and an inner flange having an inner rim thereof in resiliently pressed rotating engagement with the perimeter of the keeper, said flanges being joined at the outer rims providing an inwardly open pocket therebetween.

2. A sealed wheel comprising a body having a hub, a rim and an intermediate portion extending from said hub to said rim, means forming a bearing cavity extending through said hub from one side wall to the other, means forming a bearing race recess in the cavity on each side of the hub and forming a shoulder, means forming a laterally open seal ring recess in the hub at the outside of each bearing ring recess and of diameter greater than the bearing ring recess, a shaft extending through the bearing cavity, a pair of bearings comprising each an outer bearing race in each bearing ring recess and an inner shaft-engaging bearing race, a relatively stationary seal ring keeper on each side comprising a dished portion overlying the bearing, means forming a shaft aperture through each keeper and means forming an annular recess in the keeper adjacent the shaft aperture and the inner bearing race, and an annular resilient seal ring stationarily confined in said last recess and in sealing engagement jointly with the keeper, the inner bearing race and the shaft, said keeper having a perimeter smaller in diameter than the seal ring recess, and an annular resilient rotating seal ring in the seal ring recess, said rotating seal ring having an outer flange in resiliently pressed stationary surface to surface engagement throughout the surface thereof with the outer wall of the seal ring recess and an inner flange having a rim thereof in resiliently pressed rotating engagement with the perimeter of the keeper, said flanges being joined at the outer rims providing an inwardly open pocket therebetween.

3. A sealed wheel comprising a body having a hub, a rim and an intermediate portion extending from said hub to said rim, means forming a bearing cavity extending through said hub from one side wall to the other, means forming a bearing race recess in the cavity on each side of the hub and forming a shoulder, means forming a laterally open seal ring recess in the hub at the outside of each bearing ring recess and of diameter greater than the bearing ring recess, a shaft extending through the bearing cavity, a pair of bearings comprising each an outer bearing race in each bearing ring recess and an inner bearing race in engagement with the shaft, wheel supports forming a space therebetween for retention of the wheel, a relatively stationary seal ring keeper on each side, each keeper comprising a dished portion overlying the adjacent bearing, an annular mid-portion in engagement with the inner bearing race, means forming a central shaft aperture therethrough and means forming an annular recess on the outside face of the keeper adjoining the shaft aperture, and an annular seal ring compressed in said recess in sealing engagement with the keeper, the shaft and the adjacent wheel support, said keeper having a perimeter smaller in diameter than the seal ring recess, and an annular resilient rotating seal ring in the seal ring recess, said rotating seal ring having an outer flange in face to face stationary resiliently pressed engagement throughout the surface thereof with the outer wall of the seal ring recess and an inner flange having a rim only thereof in resiliently pressed rotating engagement with the perimeter of the keeper, said flanges being joined at the outer rims providing an inwardly open pocket therebetween.

4. A sealed wheel comprising a wheel body having a hub, a rim, and opposite side walls extending from the hub to the rim, the body having a bearing cavity formed therein extending axially through the hub to and between said side walls, said hub having two annular bearing-race recesses formed therein open to and of larger diameter than said cavity and adjacent the ends of the cavity respectively, said side walls having annular seal-ring recesses formed therein open to and of larger diameter than the bearing-race recesses respectively, said cavity and recesses being axially aligned, wheel supports on opposite sides of the wheel, a shaft extending axially through the bearing cavity to and between the wheel supports, two bearing assembles around the shaft, each assembly comprising concentric inner and outer bearing races and an the shaft and in tight abutment with and between the races, the outer bearing races extending into the bearing-race recesses respectively, two annular keepers around the shaft and in tight abutment with and between the wheel supports and the inner races respectively for maintaining the inner races non-rotatable around the shaft, each keeper extending radially outward from the shaft to an outer periphery of the keeper disposed in a seal-ring recess, the outer peripheries of the keepers being of smaller diameter than the outer walls of the seal-ring recesses thereby to define an annular space around the keeper peripheries, each seal-ring recess having an annular resilient seal-ring positioned therein, said seal-rings having an outer flange in face to face stationary resiliently pressed engagement throughout the surface thereof with the outer wall of a seal-ring recess and an inner flange having a rim only thereof in resiliently pressed rotating engagement with the perimeter of a keeper, said inner flange extending from the outer flange and being frusto-conical in configuration.

References Cited in the file of this patent

UNITED STATES PATENTS

| | | |
|---|---|---|
| 1,538,268 | Casler | May 19, 1925 |
| 1,734,326 | Chesnutt | Nov. 5, 1929 |
| 1,743,757 | Chesnutt | Jan. 14, 1930 |
| 2,512,148 | Gaines | June 20, 1950 |
| 2,587,405 | Stevens et al. | Feb. 26, 1952 |
| 2,617,698 | Gaines | Nov. 11, 1952 |
| 2,626,839 | Creson et al. | Jan. 27, 1953 |